United States Patent [19]

Küppers et al.

[11] Patent Number: 5,374,885
[45] Date of Patent: Dec. 20, 1994

[54] METHOD AND APPARATUS FOR BRAKING A ROTARY COMPONENT IN A TEXTILE FIBER PROCESSING MACHINE

[75] Inventors: Ernest W. Küppers; Fritz Hösel, both of Monchen-Gladbach, Germany

[73] Assignee: Trützschler GmbH & Co. KG, Monchen-Gladbach, Germany

[21] Appl. No.: 672,894

[22] Filed: Mar. 21, 1991

[30] Foreign Application Priority Data

Mar. 21, 1990 [DE] Germany ............ 4009005

[51] Int. Cl.$^5$ .............................. H02P 3/22
[52] U.S. Cl. .................... 318/757; 318/760; 318/364
[58] Field of Search ........... 318/760, 761, 762, 757, 318/758, 766, 362, 364, 366, 269, 382; 57/93; 180/197

[56] References Cited

U.S. PATENT DOCUMENTS

| | | |
|---|---|---|
| 3,514,682 | 5/1970 | Corey .................... 318/761 |
| 3,530,542 | 9/1970 | Burnham . |
| 3,699,416 | 10/1972 | Sloan et al. ............... 318/761 |
| 3,780,513 | 12/1973 | Watanabe et al. ............ 57/93 |
| 3,906,315 | 9/1975 | Gotisar ..................... 318/761 |
| 3,999,249 | 12/1976 | Katoh et al. . |
| 4,088,933 | 5/1978 | Hashimoto et al. ........... 318/269 |
| 4,187,585 | 2/1980 | Lowe . |
| 4,280,249 | 7/1981 | Lowe . |
| 4,305,030 | 12/1981 | Lorenz . |
| 4,361,871 | 11/1982 | Miller et al. ................ 180/197 |
| 4,628,980 | 7/1987 | Sugimoto et al. ............ 318/762 |

FOREIGN PATENT DOCUMENTS

| | | |
|---|---|---|
| 0142744 | 5/1985 | European Pat. Off. . |
| 0283049 | 9/1988 | European Pat. Off. . |
| 2612206 | 9/1988 | France . |
| 892638 | 3/1962 | United Kingdom . |
| 1014000 | 12/1965 | United Kingdom . |
| 1228757 | 4/1971 | United Kingdom . |
| 1600558 | 10/1981 | United Kingdom . |
| 2107946 | 5/1983 | United Kingdom . |
| 2205458 | 12/1988 | United Kingdom . |
| 86/04753 | 8/1986 | WIPO . |

Primary Examiner—William M. Shoop, Jr.
Assistant Examiner—John W. Cabeca
Attorney, Agent, or Firm—Spencer, Frank & Schneider

[57] ABSTRACT

An apparatus for braking a rotary component of a fiber processing machine includes an asynchronous motor having a stator winding and an output shaft connected to the rotary component; a direct current generating device having an output connectable to the stator winding for applying an electric braking torque to the motor; and a switching arrangement for selectively connecting the stator winding to an alternating current source for normally driving the motor or to the output of the direct current generating device for electrically braking the motor.

2 Claims, 4 Drawing Sheets

METHOD AND APPARATUS FOR BRAKING A ROTARY COMPONENT IN A TEXTILE FIBER PROCESSING MACHINE

CROSS REFERENCE TO RELATED APPLICATION

This application claims the priority of German Application No. P 40 09 005.1 filed Mar. 21, 1990, which is incorporated herein by reference.

BACKGROUND OF THE INVENTION

This invention relates to a method and an apparatus for braking a rotary component of a textile fiber processing machine, such as a cylinder or roll in a bale opener, cleaner, card or rollercard unit, wherein the rotary component is associated with an electrically operable brake.

Cards or rollercard units have conventionally a main carding cylinder which, because of its substantial weight (approximately one ton) has a period of idling run in the order of magnitude of ten minutes from de-energization to stoppage. Safety considerations require that the access doors of such machine remain locked until the last rotary component is at a standstill. Particularly in case of servicing needs it is desirable that the access doors be opened as soon as possible after de-energization of the machine.

In a known apparatus as disclosed in U.S. Pat. No. 3,530,542 an electric brake 67 is coupled by an input shaft with the main cylinder of a card or is coupled by means of a belt with the principal drive motor for the carding cylinder. The braking device 67 is not coupled electrically with the main drive motor; rather, it may be energized or de-energized solely by means of contacts 204–6. Since in the known apparatus no electric connection exists between the drive motor and the braking device and only a mechanical coupling is present, this prior art braking system consists solely of an electrically operable mechanical brake. It is a disadvantage of such a system that the mechanical brake is exposed to wear and further, it has intermediate elements which have to be additionally braked, thus reducing the efficiency of the braking process. It is a further disadvantage of such a prior system that after energization of the machine the braking system can no longer be controlled.

SUMMARY OF THE INVENTION

It is an object of the invention to provide an improved method and apparatus of the above-outlined type from which the discussed disadvantages are eliminated and which, in particular, provides for shortening the period of idling run of the rotary component to be braked under adaptation of braking conditions and further, which is not exposed to wear and is maintenance free.

These objects and others to become apparent as the specification progresses, are accomplished by the invention, according to which, briefly stated, the drive motor for the rotary component is an asynchronous motor whose stator winding is connectable by a switching device to either an a.c. source or a d.c. source.

According to the invention, the direct current is used to brake the drive motor and the d.c. source is electrically directly connectable to the drive motor. Upon such a connection, the electric braking device is directly combined with the drive motor and thus, in a particularly advantageous manner, the braking energy applied to the drive motor is directly used for braking the same. In contrast to known systems, no additional elements of a mechanical braking device participate in the braking process, so that the efficiency of the braking process is very significantly increased. Further, the braking device according to the invention is wholly free from wear and needs no maintenance.

The invention has further additional advantageous features as follows:

The drive motor is connected with the rotary component of the fiber processing machine by a transmission element, such as an endless drive belt. The d.c. source generates a variable direct current. The d.c. source is connected to a regulator to which there is also connected the switching device, an electric timer and an rpm sensor for the rotary component. Further, the regulator is connected with an rpm sensor for the drive motor. The direct current is varied as a function of time during the braking process. The direct current is either continuously or stepwise varied. The direct current is varied as a function of the rpm of the rotary component or as a function of the drive motor rpm. The direct current is varied in such a manner as a function of the rotary component rpm and the drive motor rpm that a predetermined ratio of the rpm's relative to one another is continuously preserved. The direct current source is connected to a control and regulating device, such as a microcomputer for the textile fiber processing machine. The control and regulating device is connected with the measuring members for actual operational data such as the rpm of the rotary component (for example, the carding cylinder), the type of fiber material, the quantity of fiber material and the like. The control and regulating device is connected with a memory storing data for predetermined braking conditions, expressed, for example, by algorithms, tables, curves or the like. The braking apparatus is connected with an automatic shut-off device for the braking current. According to a further feature of the invention in which access doors and the like are arranged, the control and regulating device is electrically coupled with the actuating device for opening or locking the access doors.

According to the invention, the rotary component, such as the main carding cylinder of a carding machine is brought to a stop during a minimum period and under optimal machine handling conditions inasmuch as no belt wear occurs and no movable components for implementing the braking are present. The optimal machine handling and the minimum time period are obtained by programming the braking system to be coordinated with the specific conditions preexisting in the rotary machine and taking into account the technological aspects for an advantageous adaptation.

As a d.c. voltage is applied to a stator winding of the drive motor, the resulting current flow generates a magnetic field which applies a braking torque to the rotor of the drive motor. By providing both the rotary machine component and the drive motor with a respective rpm sensor, the braking current may be varied as a function of the ratio between the two rpm's to thus minimize the period during which the rotary component is brought to a standstill and to prevent slippage of the belt that drives the rotary component from the motor. By virtue of the fact that the ratio between the rpm's of the drive motor and the rotary component of the fiber processing machine is known (which is given by the ratio between the belt pulleys), the braking current may be of such an intensity that just ensures a preservation of the ratio. A change of the ratio means that slippage of the belt is occurring. In such a case, the braking current may be further lowered until the known ratio is reestablished. Such a monitoring is performed continuously during the entire braking process.

The motor-braking direct current is adapted to the particular requirements by varying the current intensity during the entire braking process. The device generating the direct current is expediently connected directly with the microcomputer through a corresponding interface. The extent of varying the braking current is calculated by the machine control or the braking apparatus itself and is applied to or processed by the braking apparatus. The transfer of the data for varying the current may be effected by means of a serial or parallel interface in case of an external braking device. In case of an electric braking device which is a direct component of the machine control, the data exchange may be effected directly over the system bus. The determination of the momentarily optimal braking current is effected in such a manner that the rotary component is brought to a standstill in a minimum time period without placing more than the absolutely necessary stress on the mechanical force-transmitting components (for example, belts, gearing or the like). This applies particularly in case of using flat belts whose slippage is an indication of excessive braking which often leads to a destruction (burning) thereof. The determination of the optimal course of the braking process may be effected empirically and the result may be inputted in the machine control or the electric braking device, for example, in the form of an algorithm or tables. The electric braking device may include an automatic brake current shutoff circuit. Such shutoff may be effected as a function of time, current or rpm.

DESCRIPTION OF THE PREFERRED EMBODIMENT

Figure 1:
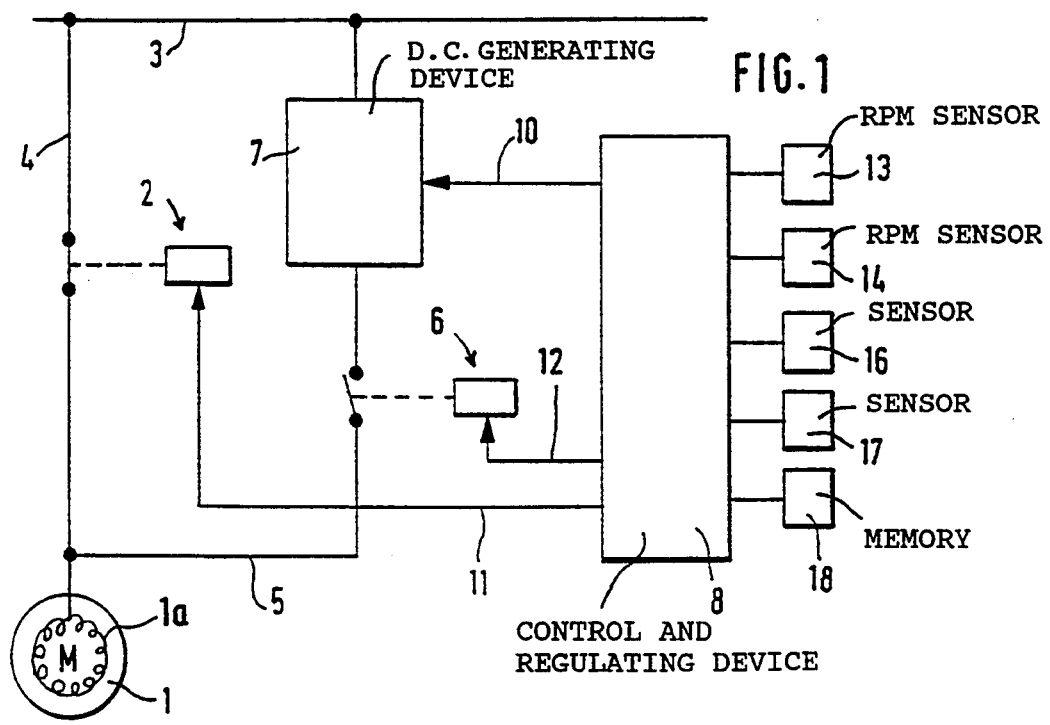
FIG. 1 is a block diagram of a preferred embodiment of the invention.

In FIG. 1, a stator winding 1a of an asynchronous drive motor 1 is connected to an a.c. line 3 by a conductor 4 with the intermediary of a circuit breaker relay 2. The stator winding 1a of the drive motor 1 is connected to a device 7 for generating a direct current by a conductor 5 with the intermediary of a circuit breaker relay 6. An input of the device 7 is connected to the a.c. line 3. A control and regulating device 8 for a textile fiber processing machine (such as a card 9 shown in FIG. 2) is connected with the d.c. generating device 7 by a conductor 10 and is further connected with the relay 2 by a conductor 11 and the relay 6 by a conductor 12.

The d.c. generating device 7 (braking unit) serves to convert the alternating current of the line 3 to a variable direct current.

During normal operation of the fiber processing machine, the relay 2 is closed and the relay 6 is open so that drive motor 1 is directly connected to the a.c. line 3.

For braking of the rotary component, such as the main cylinder 15 of the card 9, for example, simultaneously with the removal of the driving torque for the rotary component, the relay 2 is opened and the relay 6 is closed, whereby the stator winding of the drive motor 1 is connected to the output of the direct current generating device 7 and, at the same time, a direct connection with the a.c. line is interrupted. Thus, in this manner a switchover occurs from the a.c. source 3 to the d.c. source 7 and the direct current generated by the d.c. source 7 is thus utilized for braking the drive motor 1.

Inputs of the control and regulating device 8 are connected with an rpm sensor (such as a tachogenerator) 13 for measuring the rpm of the cylinder 15 and an rpm sensor (such as a tachogenerator) 14 for measuring the rpm of the drive motor 1. In this manner, the direct current may be altered as a function of the rpm of the cylinder 15 and/or the rpm of the drive motor 1. To inputs of the control and regulating device 8 further sensors are connected, for example, a sensor 16 for determining the type of fiber material and a sensor 17 for determining the quantities of the processed fiber. The control and regulating device 8 is further connected with a memory 18 in which there are stored predetermined braking conditions and braking courses in the form of algorithms, tables or curves.

Figure 1A:
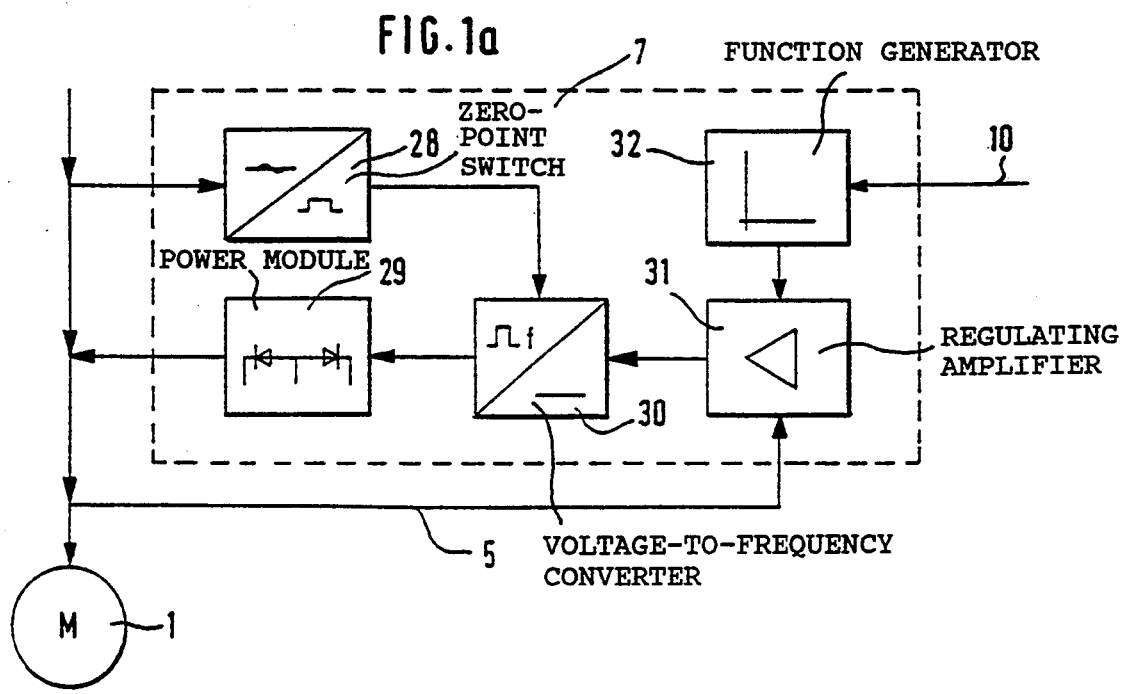
FIG. 1a is a block diagram of a component of the preferred embodiment.

Turning to FIG. 1a, there is illustrated therein a block diagram of the direct current generating device (braking unit) 7 which includes a zero-point switch 28, a power module 29, a voltage-to-frequency converter 30, a regulating amplifier 31 and a function generator 32 (programming).

Figure 1B:
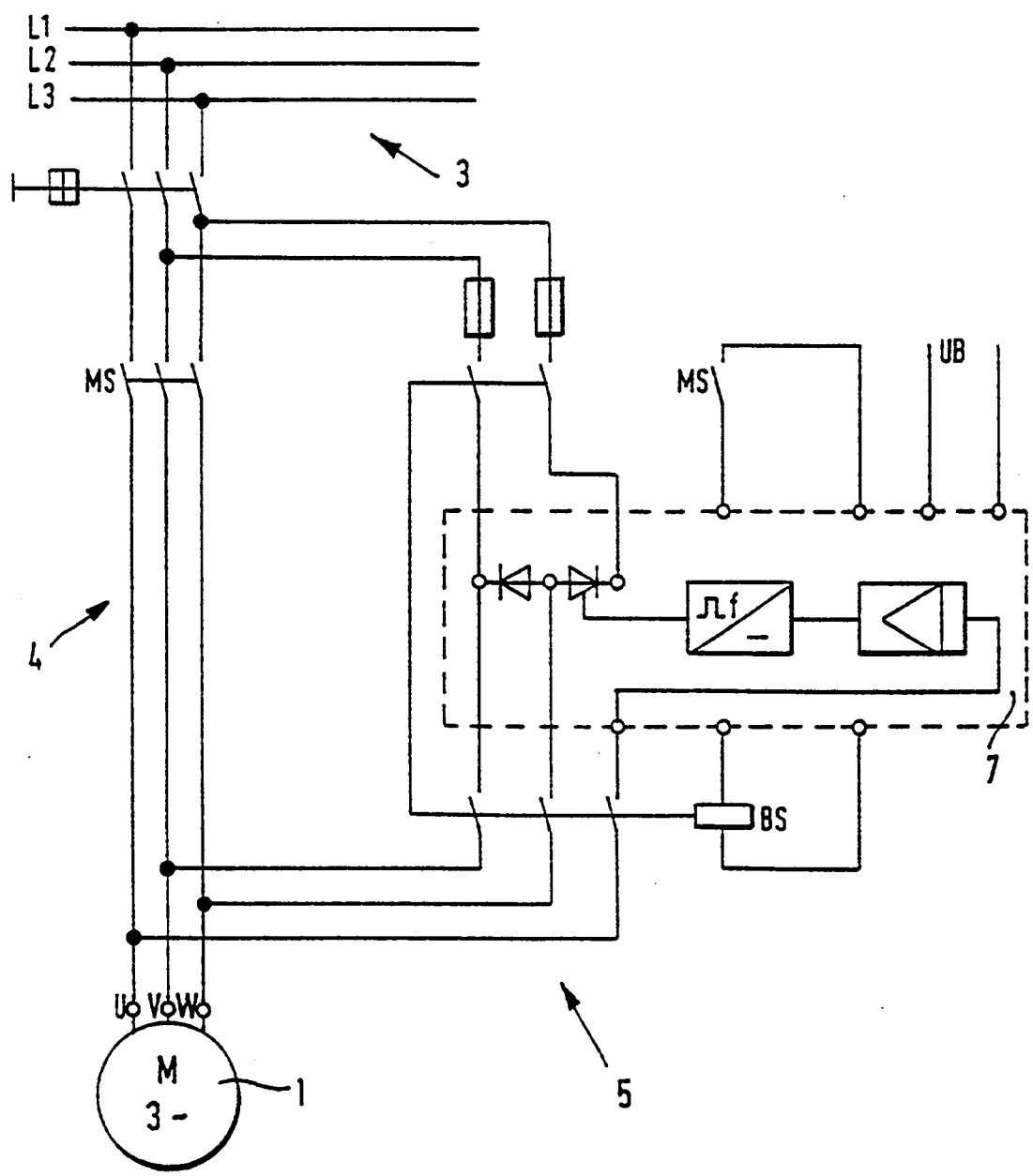
FIG. 1b is a block diagram of connecting circuits between components of the preferred embodiment.

FIG. 1b illustrates in detail the circuit connecting the drive motor 1 and the direct current generating device 7. $L_1$, $L_2$ and $L_3$ designate the three-phase a.c. line 3, MS designates a motor relay, BS designates a brake relay and UB designates a supply voltage source. The drive motor 1 is connected by means of the conductor 4 with the a.c. line 3 and by means of conductor 5 with the direct current generating device 7.

Figure 2:
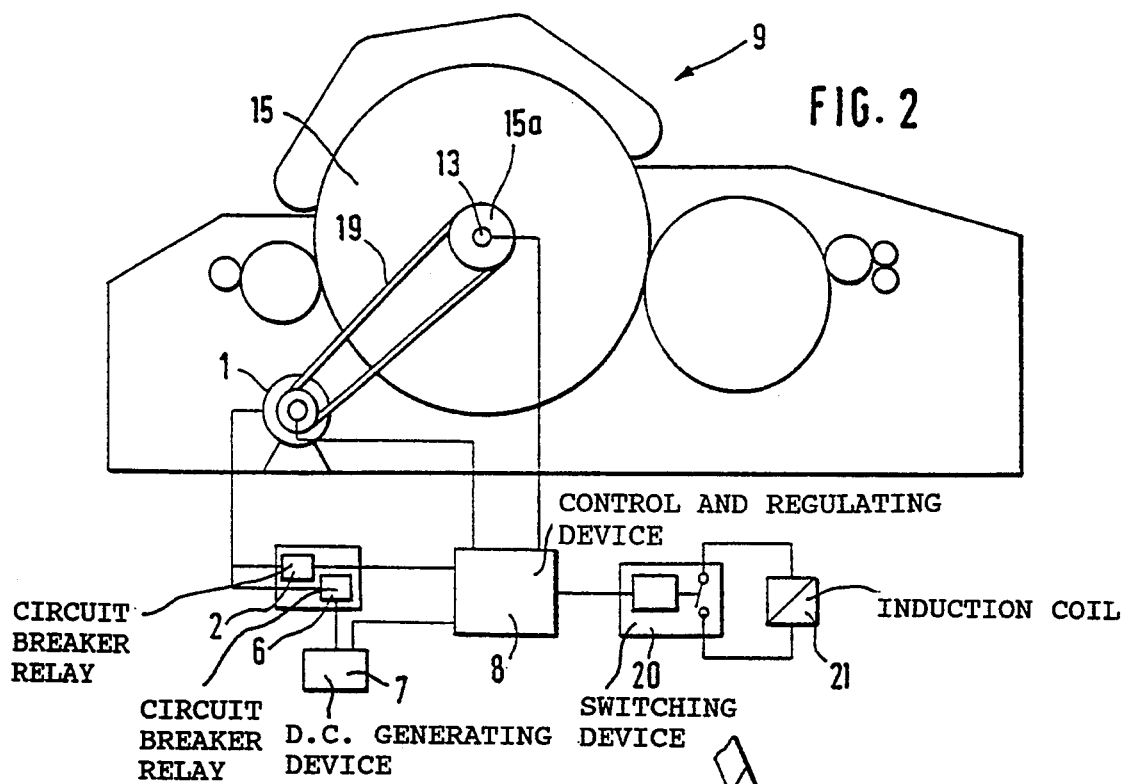
FIG. 2 is a schematic side elevational view of a carding machine incorporating the invention.
Figure 3:
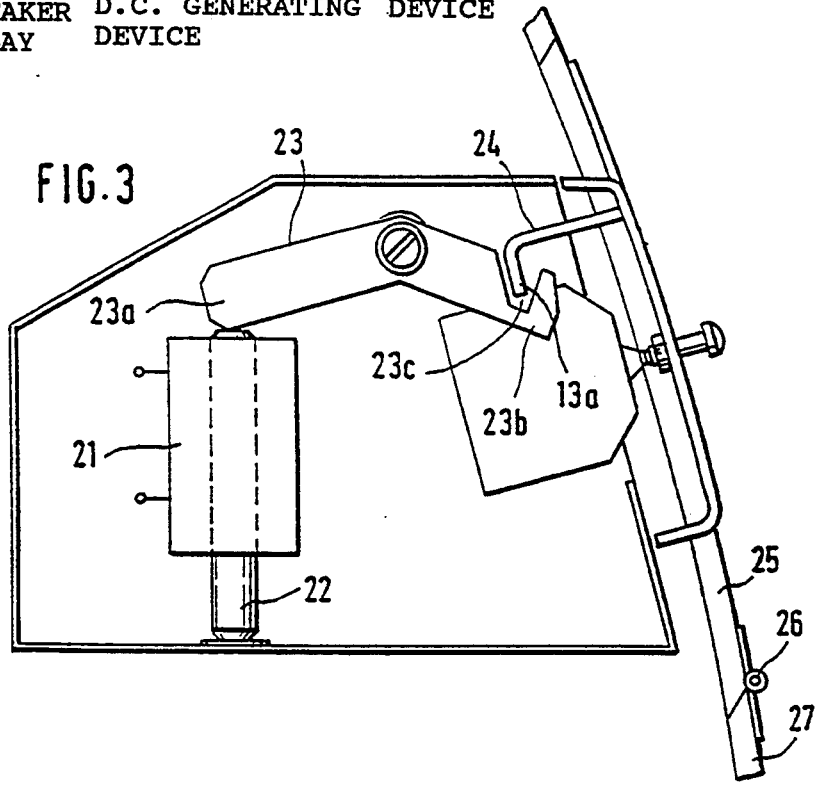
FIG. 3 is a schematic side elevational view of an electrically operated door locking mechanism adapted to be coupled to the apparatus of the invention.

Turning to FIG. 2, there is illustrated therein the carding machine 9 which may be, for example, an EXACTACARD DK 740 model, manufactured by Trützschler GmbH & Co. KG, Mönchengladbach, Germany. The asynchronous drive motor 1 is torque-transmittingly coupled to the drive shaft 15a of the main carding cylinder 15 by means of an endless drive belt 19. The control and regulating device 8 is connected by means of a switching device 20, for example, a relay, to an induction coil 21. As shown in FIG. 3, the induction coil 21 surrounds an armature 22 forming part of an access door locking device which includes a lever 23, one end 23a of which is operatively connected with one end of the armature 22. The other end 23b of the lever 23 has a groove 23c into which extends an end 13a of a hook 24 affixed to an access door 25 articulated at 26 to a cover 27. Upon energization of the solenoid 21 (effected, for example, by the device 8 when the cylinder 15 stops), the armature 22 moves upwardly as viewed in FIG. 3 and thus causes the lever 23 to pivot clockwise, freeing the hook 24, thus allowing the access door 25 to be opened.

Figure 4:
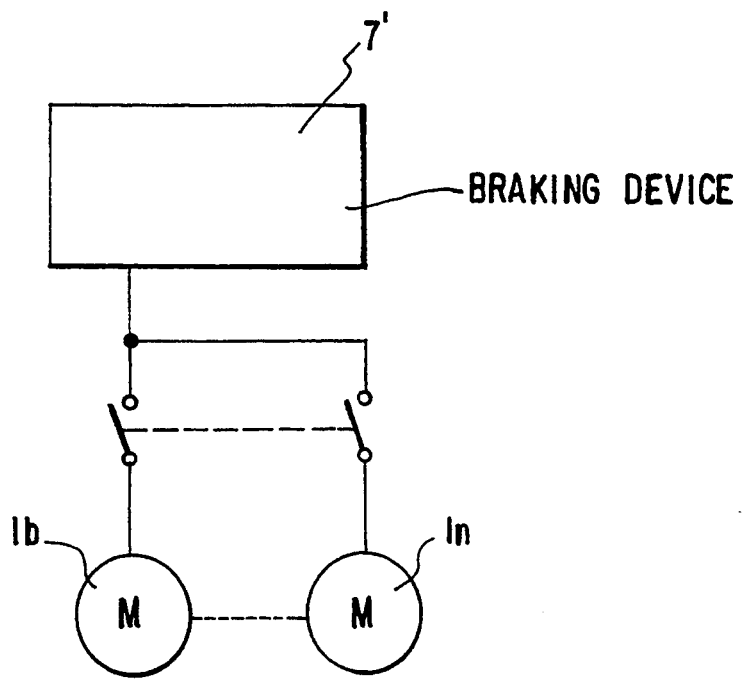
FIG. 4 is a block diagram of another preferred embodiment of the invention.
Figure 5:
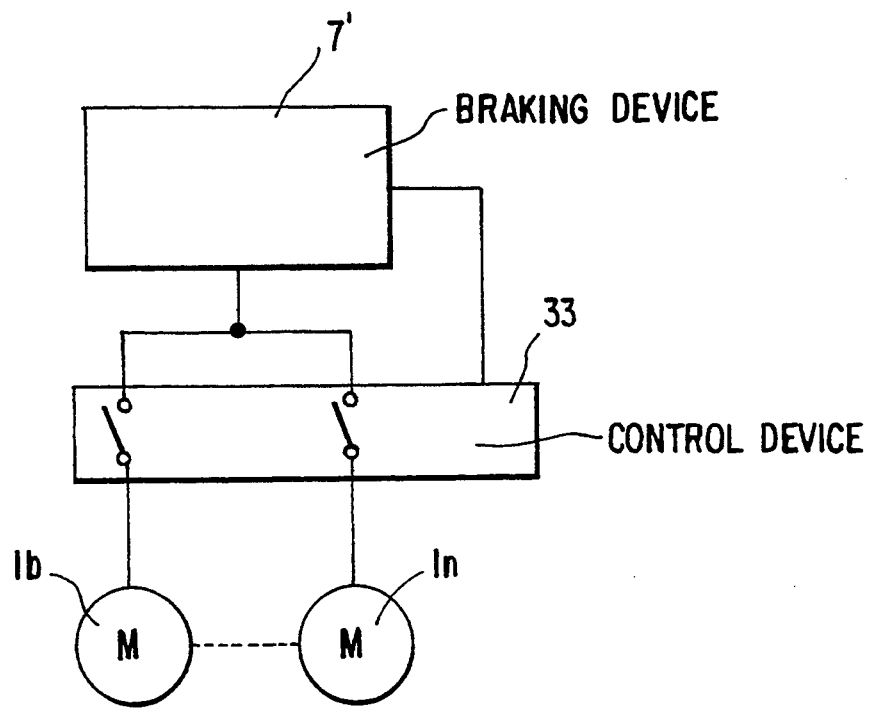
FIG. 5 is a block diagram of still a further preferred embodiment of the invention.

FIGS. 4 and 5 show two further preferred embodiments according to which a plurality of drive motors 1b...1n may be braked simultaneously (FIG. 4) or in sequence (FIG. 5) by a braking device 7'. In the FIG. 5 embodiment the motors 1b...1n are connected to the braking device 7' with the intermediary of a control device 33.

It will be understood that the above description of the present invention is susceptible to various modifications, changes and adaptations, and the same are intended to be comprehended within the meaning and range of equivalents of the appended claims.

What is claimed is:

1. An apparatus for braking a rotary component of a fiber processing machine, comprising:
    (a) an asynchronous motor having a stator winding and an output shaft; said asynchronous motor being arranged to be normally driven by an alternating current;
    (b) coupling means for torque-transmittingly connecting the output shaft to the rotary component;
    (c) a direct current generating device having an output connectable to the stator winding for applying an electric braking torque to the motor;
    (d) a switching means for selectively connecting said stator winding to an alternating current source or to said output of said direct current generating device; and
    (e) means for stepwise varying the intensity of the direct current applied to the stator winding of the motor.

2. A method of braking a rotary component of a fiber processing machine; said rotary component being normally driven by an asynchronous motor energized by an alternating current; comprising the steps of
    (a) discontinuing supply of the alternating driving current;
    (b) supplying a direct braking current to said drive motor; and
    (c) varying the intensity of the direct current in a stepped manner as a function of a parameter.

* * * * *

UNITED STATES PATENT AND TRADEMARK OFFICE
CERTIFICATE OF CORRECTION

PATENT NO. : 5,374,885
DATED : December 20, 1994
INVENTOR(S) : Ernst Wolfgang Küppers et al It is certified that error appears in the above-indentified patent and that said Letters Patent is hereby corrected as shown below:

On the title page, item [75] the first inventor's first name should read --Ernst--.

Signed and Sealed this

Twenty-eight Day of February, 1995

Attest:

BRUCE LEHMAN

Attesting Officer     Commissioner of Patents and Trademarks